United States Patent
Chakraborty et al.

(10) Patent No.: US 11,690,015 B2
(45) Date of Patent: Jun. 27, 2023

(54) REDUCING LISTEN MODE POWER CONSUMPTION OF A WIRELESS LOCAL AREA NETWORK (WLAN) DEVICE

(71) Applicant: QUALCOMM Incorporated, San Diego, CA (US)

(72) Inventors: Soumen Chakraborty, Bangalore (IN); Shwetank Kishorkumar Mistry, Bangalore (IN); Kyungwan Nam, San Jose, CA (US); Ming-Tuo Chin, Santa Clara, CA (US); James Michael Gardner, San Ramon, CA (US); Arvind Keerti, Fremont, CA (US); Chiao Cheng Huang, Hsinchu (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/214,481

(22) Filed: Mar. 26, 2021

(65) Prior Publication Data
US 2022/0312330 A1    Sep. 29, 2022

(51) Int. Cl.
*H04W 52/02* (2009.01)

(52) U.S. Cl.
CPC ... *H04W 52/0245* (2013.01); *H04W 52/0229* (2013.01)

(58) Field of Classification Search
CPC .............. H04W 52/0245; H04W 52/0229
USPC .................................................. 370/338
See application file for complete search history.

(56) References Cited

U.S. PATENT DOCUMENTS

| | | | |
|---|---|---|---|
| 6,236,674 B1 * | 5/2001 | Morelli | H04W 52/04 455/574 |
| 10,459,103 B1 * | 10/2019 | Shi | G01V 3/08 |
| 2002/0181546 A1 * | 12/2002 | Odenwalder | H04L 7/041 375/130 |
| 2007/0070929 A1 * | 3/2007 | Kang | H04B 7/2606 370/310 |
| 2009/0016474 A1 * | 1/2009 | Bertorelle | H04W 56/0035 375/356 |
| 2010/0067624 A1 | 3/2010 | Sankabathula et al. | |
| 2018/0014216 A1 * | 1/2018 | Banerjea | H04L 27/2602 |

(Continued)

OTHER PUBLICATIONS

International Search Report and Written Opinion—PCT/US2022/017586—ISA/EPO—dated May 25, 2022.

*Primary Examiner* — Gbemileke J Onamuti
(74) *Attorney, Agent, or Firm* — Holland & Hart / Qualcomm

(57) ABSTRACT

This disclosure provides methods, devices and systems for reducing power consumption when a station (STA) is operating in a listen mode. In some aspects, to reduce power consumption in the listen mode, the STA may alternate between monitoring a wireless channel for packets and not monitoring the wireless channel. When the STA is monitoring the wireless channel for packets in the listen mode, the STA may configure packet detection components to a power-on state. When the STA is not monitoring the wireless channel in the listen mode, the STA may configure packet detection components to a power-off state. During the power-on state of the listen mode, the STA may detect a preamble of a packet that was transmitted over the wireless channel. In response to detecting the preamble of the packet, the STA may switch from the listen mode to a receive mode to process the packet.

30 Claims, 10 Drawing Sheets

(56) References Cited

U.S. PATENT DOCUMENTS

| | | |
|---|---|---|
| 2019/0059055 A1 | 2/2019 | Murali |
| 2019/0132154 A1 | 5/2019 | Gurevitz et al. |
| 2019/0190765 A1 | 6/2019 | Murali et al. |
| 2019/0191374 A1 | 6/2019 | Murali et al. |

* cited by examiner

REDUCING LISTEN MODE POWER CONSUMPTION OF A WIRELESS LOCAL AREA NETWORK (WLAN) DEVICE

TECHNICAL FIELD

This disclosure relates generally to the field of wireless communication, and to reducing power consumption of a wireless local area network (WLAN) device that is operating in a listen mode.

DESCRIPTION OF THE RELATED TECHNOLOGY

A wireless local area network (WLAN) may be formed by one or more wireless access points (APs) that provide a shared wireless communication medium for use by multiple client devices, which also may be referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable other STAs within wireless range of the AP to establish or maintain a communication link with the WLAN.

In a WLAN, a STA may monitor a wireless channel for packets or other information. If the STA detects a packet on the wireless channel, the STA may receive the packet and perform operations for processing the packet. As the STA performs operations for monitoring the wireless channel, detecting the packet, and receiving the packet, the STA may operate in various modes. For example, the STA may operate in a listen mode when monitoring the wireless channel. The STA may operate in a receive mode when receiving and processing the packet. When the STA is not expecting communications over the wireless channel, the STA may operate in a sleep mode in which it does not expend resources monitoring the wireless channel.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication performed by an apparatus of a first access point (AP) in a wireless local area network (WLAN). The method may include alternating one or more components of the first WLAN device between a power-off state and a power-on state during a listen mode of the first WLAN device. The method may include receiving, during the power-on state, preamble information of a packet from a second WLAN device.

Another innovative aspect of the subject matter described in this disclosure can be implemented in an apparatus of a first WLAN device for wireless communication. The apparatus of the first WLAN device may include a processor configured to alternate one or more components of the first WLAN device between a power-off state and a power-on state during a listen mode of the first WLAN device. The apparatus of the first WLAN device may include an interface configured to obtain, during the power-on state, preamble information of a packet from a second WLAN device.

Another innovative aspect of the subject matter described in this disclosure can be implemented in a non-transitory computer-readable medium that stores instructions, which when executed by a processor of a first WLAN device, cause the first WLAN device to perform operations for communication in a WLAN. The operations may cause the first WLAN device to alternate one or more components of the first WLAN device between a power-off state and a power-on state during a listen mode of the first WLAN device. The operations may cause the first WLAN device to obtain, during the power-on state, preamble information of a packet from a second WLAN device.

Another innovative aspect of the subject matter described in this disclosure can be implemented in an apparatus of a first WLAN device for wireless communication. The apparatus of the first WLAN device may include a means for alternating one or more components of the first WLAN device between a power-off state and a power-on state during a listen mode of the first WLAN device. The apparatus of the first WLAN device may include a means for obtaining, during the power-on state, preamble information of a packet from a second WLAN device.

Aspects of the subject matter described in this disclosure can be implemented in a device, a software program, a system, or other means to perform any of the above-mentioned methods.

Details of one or more aspects of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
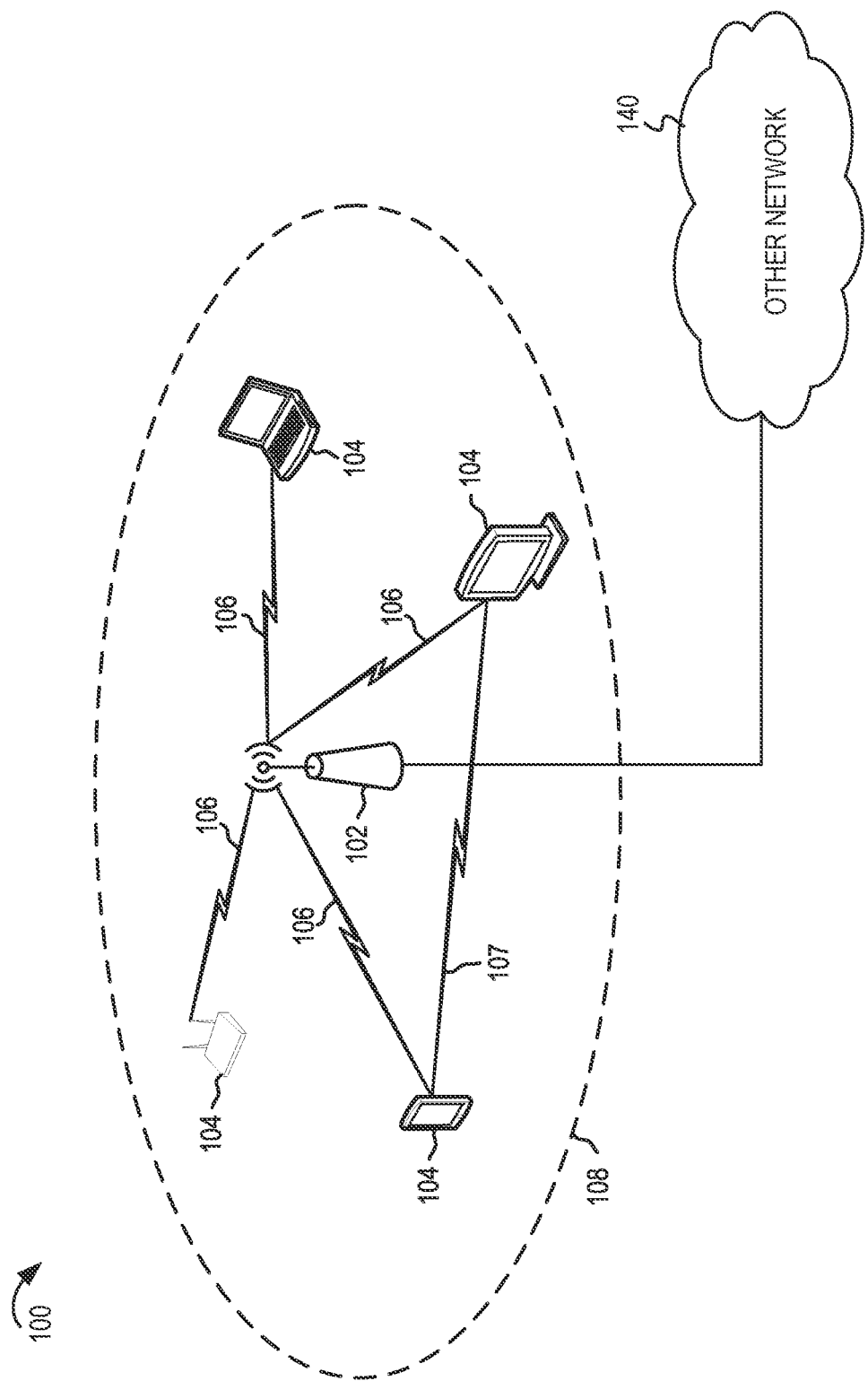
FIG. 1 shows a system diagram of an example wireless communication network.

The following description is directed to certain aspects for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described aspects may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A wireless local area network (WLAN) in a home, apartment, business, or other type of environment may include two or more WLAN devices. A WLAN may include one or more access points (APs) and one or more stations (STAs). An AP is a type of STA that performs a distribution system access function in the WLAN. For brevity, this disclosure refers to the WLAN devices which could either operate as an AP or a STA. An AP may provide wireless access to the STAs that are located in a coverage area of the AP. The STAs may include various types of WLAN devices such as mobile phones, laptops, gaming systems (including virtual and augmented reality systems (VR and AR, or collectively XR)), entertainment systems, smart appliances, wearables, and IoT devices. Some APs may be capable of establishing connectivity via more than one frequency band. For example, an AP may operate a first basic service set (BSS) on a first frequency band (such as a 2.4 GHz frequency band) and a second BSS on a second frequency band (such as a 5 GHz frequency band). For brevity, the first and second BSSs may be referred to as a first frequency band of the AP and a second frequency band of the AP, respectively.

In a WLAN, a STA may utilize various operational modes including a listen mode, receive mode and sleep mode. In the listen mode, the STA may continuously monitor a wireless channel for packets. To continuously monitor the wireless channel in the listen mode, the STA may continuously provide power to components that detect packets on the wireless channel. If the STA detects a packet, the STA may enter the receive mode to process the detected packet. While processing the packet in the receive mode, the STA may continuously consume power. If the STA is not expecting communications for a relatively long duration, the STA may enter the sleep mode in which it ceases monitoring the wireless channel. In the sleep mode, the STA may save power because it stops providing power to the packet detection components. The STA may inform the AP before entering the sleep mode, so the AP does not transmit packets to the STA while the STA is in the sleep mode. The AP may resume transmitting packets to the STA after the STA exits the sleep mode. Operating in the sleep mode may cause higher latencies for packet delivery, so the STA may avoid the sleep mode in many situations. To avoid sleep mode, STAs may spend considerable time in the listen mode continuously powering packet detection components.

Various aspects of this disclosure relate generally to techniques for saving power when a STA is monitoring a wireless channel for packets. Some aspects more specifically relate to a STA that can implement a listen mode that reduces power consumption. To reduce power consumption in the listen mode, the STA may alternate between monitoring the wireless channel for packets and not monitoring the wireless channel. When the STA is monitoring the wireless channel for packets in the listen mode, the STA may configure packet detection components to a power-on state. When the STA is not monitoring the wireless channel in the listen mode, the STA may configure packet detection components to a power-off state. The packet detection components of the STA may include one or more components of an RF front end, an analog-to-digital converter (ADC) and one or more components of a baseband processing unit. In some implementations, the STA may alternate between the power-on state and the power-off state based on a duty cycle, as described further herein. During the power-on state of the listen mode, the STA may detect a preamble of a packet that was transmitted over the wireless channel. In response to detecting the preamble of the packet, the STA may switch from the listen mode to the receive mode. In the receive mode, the STA may remain in the power-on state to receive and process the packet.

In some implementations, in the listen mode, the STA may detect the preamble of the packet by performing autocorrelation on information received over the wireless channel. For example, the STA may perform autocorrelation to detect information of a legacy short training field (L-STF) and a legacy long training field (L-LTF) of a physical layer (PHY) protocol data unit (PPDU). In the listen mode, packet detection components of the STA may remain in the power-on state for a duration that allows the STA to perform the autocorrelation. If the STA does not detect a packet preamble, the STA may switch into the power-off state of the listen mode. However, if the STA detects the packet preamble, the STA may remain in the power-on state and enter the receive mode in which it processes the packet. In some implementations, the duration of time spent performing autocorrelation in the power-on state may be based on a received signal strength indicator (RSSI) associated with the packet, channel condition metrics (such as signal-to-noise (SNR) ratio or channel congestion) or other suitable metrics, as described further herein.

In some implementations, the STA may detect the preamble of the packet by performing match filtering on information received over the wireless channel. For example, the STA may perform match filtering to detect symbols of the L-STF and L-LTF of a PPDU. If the STA does not detect the preamble, it may enter the power-off state of the listen mode.

Particular implementations of the subject matter described in this disclosure can be implemented to realize one or more of the following potential advantages. Traditional techniques for monitoring a wireless channel in a listen mode may involve continuously powering packet detection components as they continuously monitor a wireless channel. In some implementations, a STA may intermittently monitor the wireless channel for a packet preamble in the listen mode. By intermittently monitoring the wireless channel, the STA may reduce power consumed during the listen mode. For a STA that does not include a cooling fan, reducing power consumption enables the STA to operate at lower temperatures. For a STA that operates on battery power, reducing power consumption may extend battery life of the STA. The techniques described herein may further reduce power consumption of the STA as future wireless standards (such as future IEEE 802.11 standards) change the packet preamble. For example, based on future modifications to the packet preamble, some implementations of the STA may spend more time in a power-off state when intermittently monitoring the wireless channel. Since WLANs typically include multiple STAs, the power savings may be substantial.

FIG. 1 shows a system diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11 aa, 802.11ah, 802.11 ad, 802.11aq, 802.11ay, 802.11 ax, 802.11az, 802.11ba and 802.11be). The WLAN 100 may include numerous WLAN devices such as an access point (AP) 102 and multiple stations (STAs) 104 that have a wireless association with the AP 102. While only one AP 102 is shown, the WLAN 100 also can include multiple APs 102. The IEEE 802.11-2016 standard defines a STA as an addressable unit. An AP is an entity that contains at least one STA and provides access via a wireless medium (WM) for associated STAs to access a distribution service (such as another network, not shown). Thus, an AP includes a STA and a distribution system access function (DSAF). In the example of FIG. 1, the AP 102 may be connected to a gateway device (not shown) which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacons including the BSSID to enable any STAs 104 within wireless range of the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP. The AP 102 may provide access to external networks (such as the network 140) to various STAs 104 in the WLAN via respective communication links 106. To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 may assign an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater RSSI or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 107. Additionally, two STAs 104 may communicate via a direct communication link 107 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 107 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ad, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs).

Each of the frequency bands may include multiple sub-bands or frequency channels. For example, PPDUs conforming to the IEEE 802.11n, 802.11ac, 802.11ax and 802.11be standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs conforming to the IEEE 802.11n, 802.11ac, 802.11ax, and 802.11be standard amendments may be transmitted over physical channels having bandwidths of 40 MHz, 80 MHz, 80+80 MHz, 160 MHz, 160+160 MHz or 320 MHz by bonding together two or more 20 MHz channels, which can be contiguously allocated or non-contiguously allocated. For example, IEEE 802.11n describes the use of up to 2 channels (for a combined 40 MHz bandwidth) and defined a High Throughput (HT) transmission format. IEEE 802.11ac describes the use of up to 8 channels (for a maximum combined 160 MHz bandwidth) and defined a Very High Throughput (VHT) transmission format. IEEE 802.11ax also supports up to a combined 160 MHz bandwidth (which may be a combination of up to 8 channels of 20 MHz width each). IEEE 802.11be may support up to a combined 320 MHz bandwidth (which may be a combination of up to 16 channels of 20 MHz width each).

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each PPDU is a composite structure that includes a PHY preamble, a PHY header, and a payload in the form of a PLCP service data unit (PSDU). For example, the PSDU may include the PHY preamble and header (which may be referred to as PLCP preamble and header) as well as one or more MAC protocol data units (MPDUs). The information provided in the PHY preamble and header may be used by a receiving device to decode the subsequent data in the PSDU. In instances in which PPDUs are transmitted over a bonded channel, the preamble and header fields may be duplicated and transmitted in each of the multiple component channels. The PHY preamble may be used for packet detection, automatic gain control and channel estimation, among other uses. The format of, coding of, and information provided in the PHY header is based on the particular IEEE 802.11 protocol to be used to transmit the payload, and typically includes signaling fields (such as SIG-A and SIG-B fields) that include BSS and addressing information, such as a BSS color and a STA ID.

Figure 2:
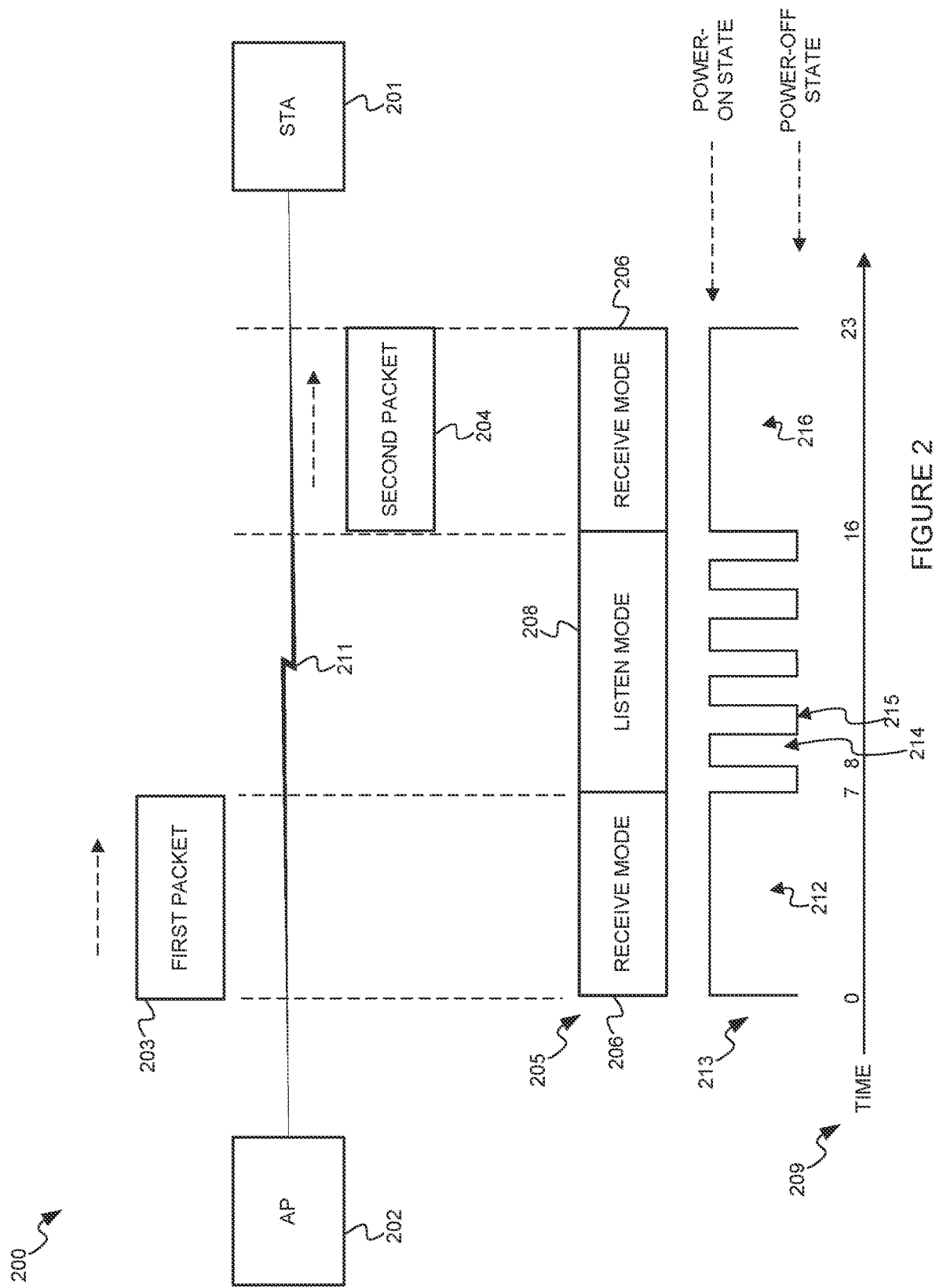
FIG. 2 shows a diagram illustrating an example station (STA) alternating between modes and power states when monitoring for and processing packets over a wireless channel.

FIG. 2 shows a diagram 200 illustrating an example STA 201 alternating between modes and power states when monitoring for packets over a wireless channel 211. The STA 201 may monitor the wireless channel 211 for packets transmitted by an AP 202. The AP 202 is an example of the AP 102 described with reference to FIG. 1. The STA 201 is an example of the STA 104 described with reference to FIG. 1. The STA 201 may alternate between a receive mode and a listen mode. A mode graph 205 shows one example of the STA 201 alternating between the receive mode 206 and the listen mode 208. In the receive mode 206, packet detection components of the STA 201 may remain in a power-on state in order to process a packet received over the wireless channel 211. In some implementations, packet detection components of the STA 201 may include one or more components of the RF front end, ADC, and one or more components of a baseband processing unit. In the listen mode 208, the STA 201 may intermittently monitor the wireless channel 211 for a packet. For example, the STA 201 may alternate between monitoring and not monitoring the wireless channel 211 for a packet, such as a packet transmitted by the AP 202. When monitoring the wireless channel 211 in the listen mode 208, the STA 201 may configure the packet detection components into the power-on state. When not monitoring the wireless channel 211 in the listen mode 208, the STA 201 may configure the packet detection components into the power-off state, as described further in FIGS. 4-6. For example, in the listen mode 208, the STA 201 may alternate the RF front end, ADC, and one or more components of a baseband processing unit between the power-off and power-on states.

A power state graph 213 shows one example of the STA 201 alternating between power-on and power-off states. Alternating between the power-on and power-off states also may be referred to as toggling between the power states. A timeline 209 shows time progressing from left to right. As shown in FIG. 2, the AP 202 may transmit a first packet 203 over the wireless channel 211. The STA 201 may enter the receive mode 206 (at time=0) to receive and begin processing the first packet 203. In the receive mode 206, the packet detection components of the STA 201 may remain in the power-on state (see segment 212 of the power state graph 213) in order to receive and process the first packet 203. After receiving the first packet 203, the STA 201 may switch into the listen mode 208.

The STA 201 may enter the listen mode 208 (at time=7) in which it may intermittently monitor the wireless channel 211 for a packet. When monitoring the wireless channel 211 in the listen mode 208, the STA 201 may configure packet detection components into the power-on state (such as at segment 214 of the power state graph 213). For example, the STA 201 may provide power to the packet detection components in order to enter the power-on state. When not monitoring the wireless channel 211 in the listen mode 208, the STA may configure the packet detection components into the power-off state (such as at segment 215 of the power state graph 213). For example, the STA 201 may stop providing power to the packet detection components in order to enter the power-off state, as described further in FIGS. 4-6. In some implementations, the duration of the power-on state may be approximately the same as the duration of the power-off time state. The power state graph 213 shows the power-off state lasting for a single time unit and the power-on state lasting for a single time unit. However, the power-on and power-off states may have any suitable duration. In some implementations, the duration of the power-on state may differ from the duration of the power-off time state. For example, the power-off state may last for a single time unit and the power-on state may last for one and a half time units. In some implementations, the STA 201 may alternate between the power-on state and the power-off state based on a configured duty cycle. For example, when the duration of the power-on state is the same as the duration of the power-off time state, the duty cycle may be a 50% duty cycle. Additional duty cycles are described with reference to FIG. 6. After detecting a second packet 204, the STA 201 may transition into the receive mode 206.

As shown in FIG. 2, the AP 202 may transmit the second packet 204 over the wireless channel 211 (at time=16). The STA 201 may detect the second packet 204 and change from the listen mode 208 into the receive mode 206. The transition from the listen mode 208 to the receive mode 206 is further described in FIGS. 5 and 6. While in the receive mode 206, the packet detection components may remain in the power-on state to receive and process the second packet 204 (see segment 216 of the power state graph 205). The STA 201 may remain in the receive mode 206 until processing of the second packet 204 is complete. The STA 201 may then transition to a listen mode (not shown), and the process may continue to repeat accordingly.

Figure 3:
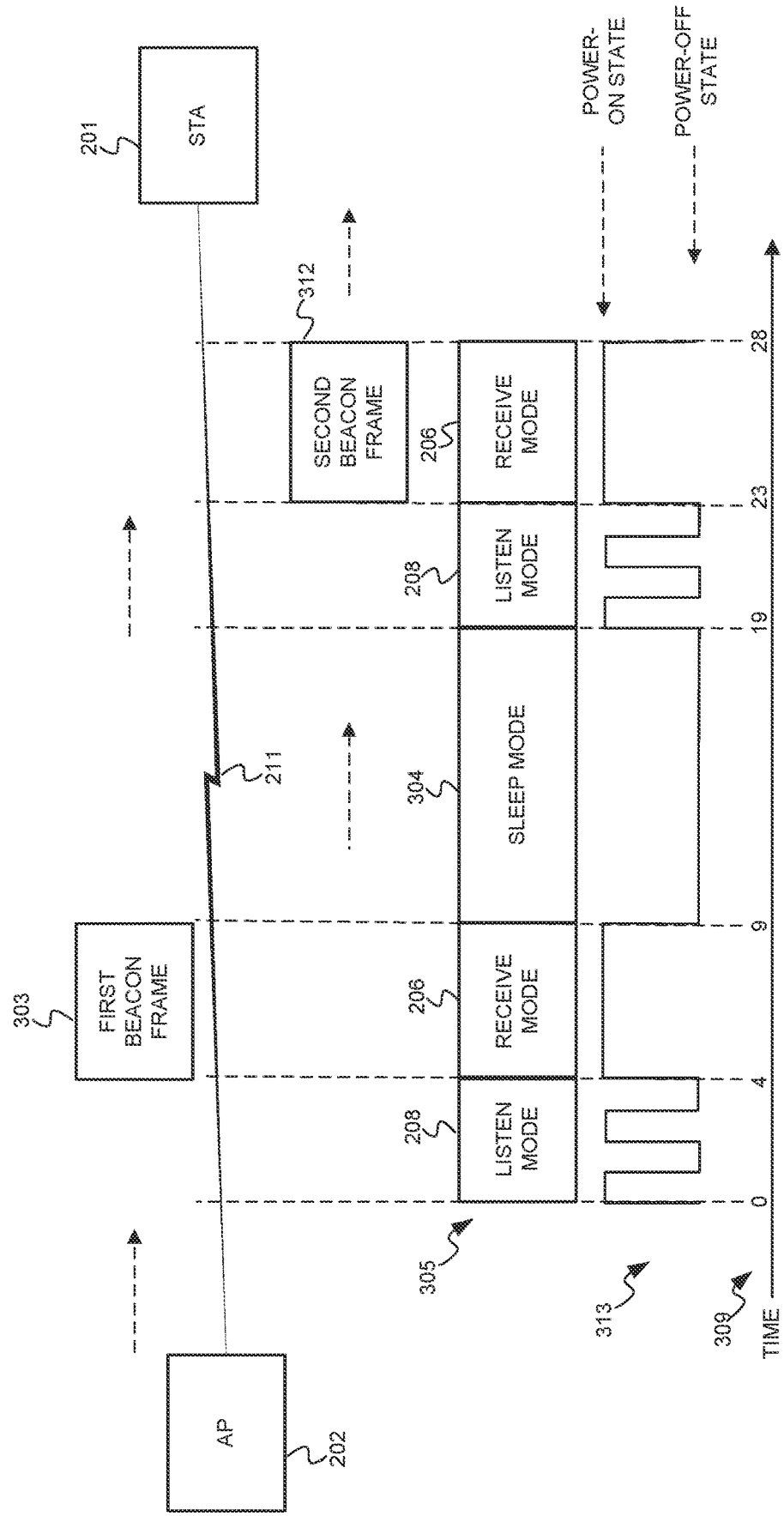
FIG. 3 shows a diagram illustrating an example STA alternating between modes and power states when monitoring for beacon frames over a wireless channel.

FIG. 3 shows a diagram 300 illustrating an example STA 201 alternating between modes and power states when monitoring for beacon frames over a wireless channel 211. The STA 201 may monitor the wireless channel 211 for beacon frames from the AP 202. The STA 201 may switch between the listen mode, the receive mode and the sleep mode. A mode graph 305 shows one example of the STA 201 switching between the listen mode 208, the receive mode 206 and the sleep mode 304. In the sleep mode 304, the STA 201 may enter a power-off state in which it ceases providing power to packet detection components. The STA 201 may determine a duration for the sleep mode 304 based on a time interval by which the AP 202 broadcasts beacon frames over the wireless channel 211. In some implementations, the time interval may be indicated in a delivery traffic interval message (DTIM) included in a beacon frame (such as a first beacon frame 303). The AP 202 may enter the sleep mode 304 between beacon frames and "wake-up" into the listen mode 208 in time to detect the next beacon frame. If a beacon frame is detected during the listen mode 208, the STA 201 may enter the receive mode 206 in which it processes the beacon frame.

A power state graph 313 shows an example of the STA 201 alternating between power-on and power-off states. A timeline 309 shows time progressing from left to right. As shown, the STA 201 may enter the listen mode 208 in which the STA 201 intermittently monitors the wireless channel for a beacon frame. In the listen mode 208, the STA 201 may alternate packet detection components between the power-on state and the power-off state. During power-on state, the STA 201 may provide power to the packet detection components and monitor the wireless channel 211. During the power-off state, the STA 201 may stop providing power to the packet detection components and stop monitoring the wireless channel 211, as described further in FIGS. 4-6.

As shown in FIG. 3, the AP 202 may transmit the first beacon frame 303 over the wireless channel 211. The STA 201 may detect the first beacon frame 303 and enter the receive mode 206. During the receive mode 206, the STA 201 may remain in the power-on state to process the first beacon frame 303.

As shown in FIG. 3, the STA 201 may enter the sleep mode 304. During the sleep mode 304, the STA 201 may configure its packet detection components into a power-off state. The duration of the sleep mode 304 may depend on a time interval in which the AP 202 broadcasts beacon frames over the wireless channel 211. The STA 201 may wake-up from the sleep mode 304 and enter the listen mode 208. As shown in FIG. 3, the AP 202 may transmit the second beacon frame 312. The STA 201 may detect the second beacon frame 312 and enter the receive mode 206 during which the STA 201 may process the second beacon frame 312.

Figure 4:
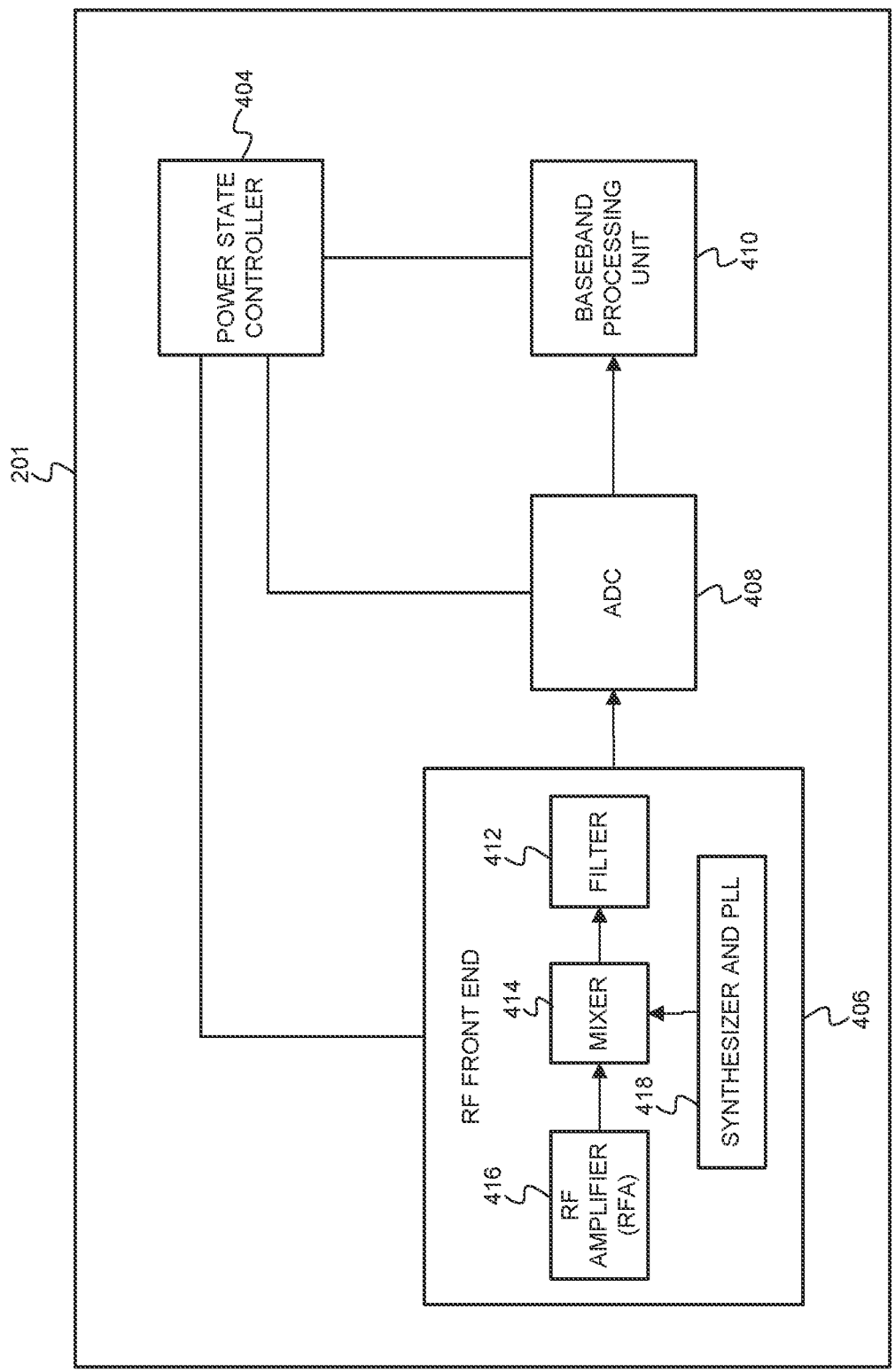
FIG. 4 is a block diagram illustrating an example STA including a power state controller that may control power states of the STA.

FIG. 4 is a block diagram illustrating an example STA 201 including a power state controller 404 that may control power states of the STA 201. The STA 201 may include the power state controller 404, an RF front end 406, an ADC 408 and a baseband processing unit 410. As described in FIGS. 2 and 3, the RF front end 406, the ADC 408, and the baseband processing unit 410 may be referred to as packet detection components. The power state controller 404 may be communicatively coupled with the RF front end 406, ADC 408 and baseband processing unit 410. The RF front end 406 may include an RF amplifier (RFA) 416, such as a low-noise amplifier. The RF front end 406 also may include a mixer 414, filter 412, and synthesizer and phase lock loop (PLL) 418. The ADC 408 may convert the analog radio information into digital information associated with the packet. The baseband processing unit 410 may process the digital information using various filters and digital processing components, such as a baseband processor. For example, during the listen mode, the baseband processing unit 410 may perform autocorrelation to detect a packet preamble. For example, the baseband processing unit 410 may perform autocorrelation to detect the STF of the packet preamble, as further described in FIGS. 5 and 6. As another example, during the listen mode, the baseband processing unit may perform match filtering to detect a packet preamble in the digital information.

The power state controller 404 may configure the packet detection components into power-on and power-off states based on operating modes of the STA. In some implementations, when the STA 201 is operating in the listen mode, the power state controller 404 may configure one or more components of the RF front end 406 into the power-off state. For example, the power state controller 404 may configure the RFA 416 of the RF front end 406 into the power-off state. In some implementations, when the STA 201 is operating in the listen mode, the power state controller 404 may configure the ADC 408 or one or more of its components (not shown) into the power-off state. In some implementations, when the STA 201 is operating in the listen mode, the power state controller 404 may configure the baseband processing unit 410 or one or more of its components (not shown) into the power-off state.

In some implementations, the power state controller 404 may continuously provide power to the synthesizer and PLL 418 of the RF front end 406. For example, even when the RFA 416, the mixer 414 and the filter 412 are in a power-off state, the synthesizer and PLL 418 may remain in the power-on state. The power state controller 404 also may continuously provide power to certain filters and components of the baseband processing unit 410 even though the RFA 416 or other components are in the power-off state during the listen mode. During the sleep mode, the power state controller 404 may configure all components of the RF front end 406, the ADC 408 and all components of the baseband processing unit 410 into the power-off state. During the receive mode, the power state controller 404 may configure all components of the RF front end 406, the ADC 408 and all components of the baseband processing unit 410 into the power-on state.

Figure 5:
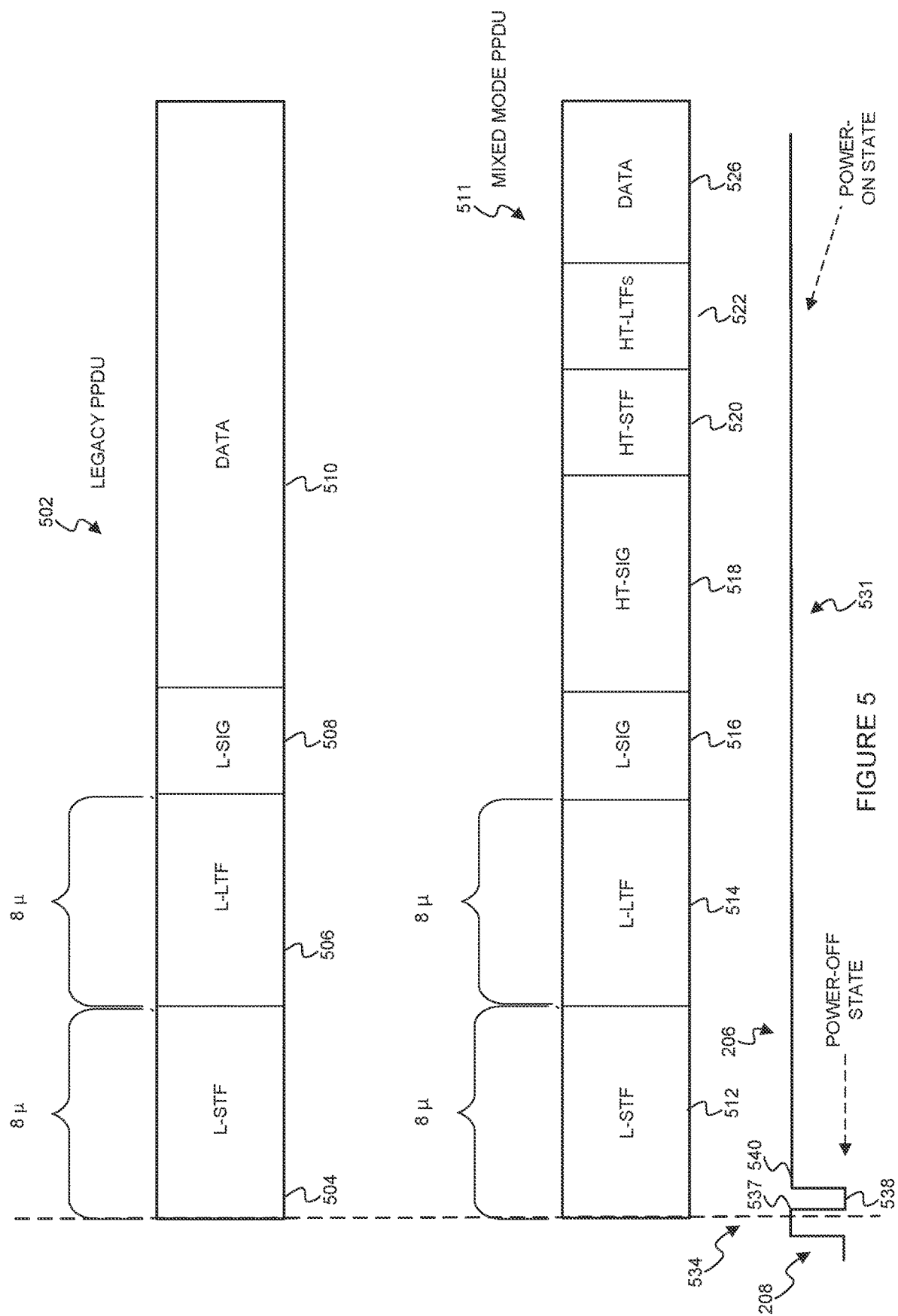
FIG. 5 shows an example of the listen mode alternating between power-on and power-off states when monitoring for physical layer (PHY) protocol data units (PPDUs).

FIG. 5 shows an example of the listen mode alternating between power-on and power-off states when monitoring for PPDUs. In some implementations, the STA 201 may detect and process a legacy PPDU 502 in the listen mode. The legacy PPDU 502 may include a preamble that includes an L-STF 504, an L-LTF 506 and a legacy signal (L-SIG) field 508. The legacy PPDU 502 also may include a data field 510. In some implementations, the STA 201 may detect and process a mixed mode PPDU 511 in the listen mode. The mixed mode PPDU 511 may include a legacy preamble and also may include one or more next generation preambles, such as one or more of an HT preamble, a VHT preamble and an Extremely High Throughput (EHT) preamble. As shown in FIG. 5, in one example, the mixed mode PPDU 511 may include both a legacy preamble and an HT preamble, and may include an L-STF 512, L-LTF 514, L-SIG 516, HT-SIG 518, HT-STF 520, HT-LTFs 522 and data field 526. When a PPDU is transmitted over a wireless channel, the transmission of the L-STF (such as the L-STF 504 or the L-STF 512) and the transmission of the other fields (such as the L-LTF 506 or the L-LTF 514) may have certain durations that are defined by the IEEE 802.11 standard. For example, the transmission of the L-STF 504 and the L-STF 512 each may have a duration of approximately 8 μs. In some implementations, the L-STF 504 and the L-STF 512 each may include STF information that is repeated ten times over the 8 μs, as further described in FIG. 6. In some implementations, the L-LTF 506 and the L-LTF 514 each may have a duration of approximately 8 μs. In some implementations, the L-LTF 506 and the L-LTF 514 each may include LTF information, such as configuration information, transmitted over the 8 μs, as further described in FIG. 6.

As shown in FIG. 5, the STA 201 may be operating in the listen mode when the legacy PPDU 502 is transmitted over the wireless channel. Transmission of the legacy PPDU 502 may occur at any time during the listen mode. Hence, reception of the L-STF 504 may occur while the STA 201 is monitoring the wireless channel (power-on state) or while the STA is not monitoring the wireless channel (power-off state). To avoid missing the L-STF 504, the STA 201 may alternate between monitoring (power-on state) and not monitoring (power-off state) using a duty cycle that enables detection of the L-STF 504 within the 8 μs transmission of the L-STF 504. For example, in some implementations, the STA 201 may be capable of detecting the L-STF 504 via autocorrelation in at least two power-state cycles (further described in FIG. 6), where a power-state cycle includes a power-on state and a power-off state having a duration based on the duty cycle. In some implementations, the number of power-state cycles for detecting the L-STF 504 may depend on an RSSI associated with the legacy PPDU 502. For example, when the RSSI is greater than a first RSSI threshold, the STA 201 may detect the L-STF 504 in two power-state cycles. As a non-limiting example, the first RSSI threshold may be approximately −85 dBm. The STA 201 may detect the L-STF 504 in more power state cycles when the RSSI is approximately less than −85 dBm. In some implementations, the number of power-state cycles for detecting the L-STF 504 also may depend on channel condition metrics (such as signal-to-noise ratio or channel congestion) or other suitable metrics. For example, the STA 201 may detect the L-STF 504 in two power-state cycles when the signal-to-noise ratio (SNR) is below an SNR threshold and more power-state cycles when the SNR is above the SNR threshold. Additional details about detecting a packet preamble are provided in the description of FIG. 6.

A power graph 531 shows the STA 201 alternating the packet detection components between the power-on and power-off states to detect the L-STF 504 or the L-STF 512. The STA 201 may alternate between the power-on and power-off states based on a duty cycle. According to the power graph 531, the STA 201 may be operating in the first power-on state 537 of the listen mode 208. A timing line 534 shows that the STA 201 may receive at least a portion of the L-STF 504 during the first power-on state 537. During the first power-on state 537, the STA 201 is monitoring the wireless channel when the L-STF 504 (or the L-STF 512) is received. Although the following example describes receiving the L-STF 504 of the legacy PPDU 502, similar steps may be performed for receiving the L-STF 512 of the mixed mode PPDU 511. In some implementations, the STA 201 may detect the L-STF 504 if the STA 201 has sufficient time in a power-on state to detect at least two repetitions of STF information in the L-STF 504 as described further in FIG. 6. As shown in FIG. 5, the STA 201 may receive the L-STF 504 without having enough time in the first power-on state 537 to detect the L-STF 504 (such as by detecting two repetitions of STF information via autocorrelation). As shown, without having detected the L-STF 504, the STA 201 may switch into a power-off state 538 in accordance to the duty cycle, and thus the STA 201 may stop monitoring the wireless channel until the next power-on state. During a second power-on state 540, the STA 201 may resume operations for monitoring the wireless channel for preamble information (such as the L-STF 504). In the second power-on state 540, the STA 201 may detect the L-STF 504 (such as by detecting two repetitions of STF information via autocorrelation). After detecting the L-STF 504, the STA 201 may switch into the receive mode 206 to process the legacy PPDU 502 in the power-on state. In some implementations, the STA 201 may detect the L-STF 504 by detecting any suitable number of repetitions of STF information of the L-STF 504 in any suitable number of power-on states. The number of repetitions of STF and number of power-on states for detecting the L-STF 504 may depend on the particular packet detection technique (such as autocorrelation).

In some implementations, the STA 201 may determine whether to alternate between the power-on and power-off states during a listen mode depending on an RSSI associated with the packet (such as the legacy PPDU 502 or the mixed mode PPDU 511). For example, if the RSSI is greater than an RSSI threshold (such as −85 dBM), the STA 201 may alternate between the power-on and power-off states during the listen mode. As another example, if the RSSI is less than a first RSSI threshold (such as −60 dBM) and greater than a second RSSI threshold (such as −85 dBM), the STA 201 may alternate between the power-on and power-off states during the listen mode. However, if the RSSI is less than the second RSSI threshold (−85 dBM), the STA 201 may remain in the power-on state throughout the listen mode.

Figure 6:
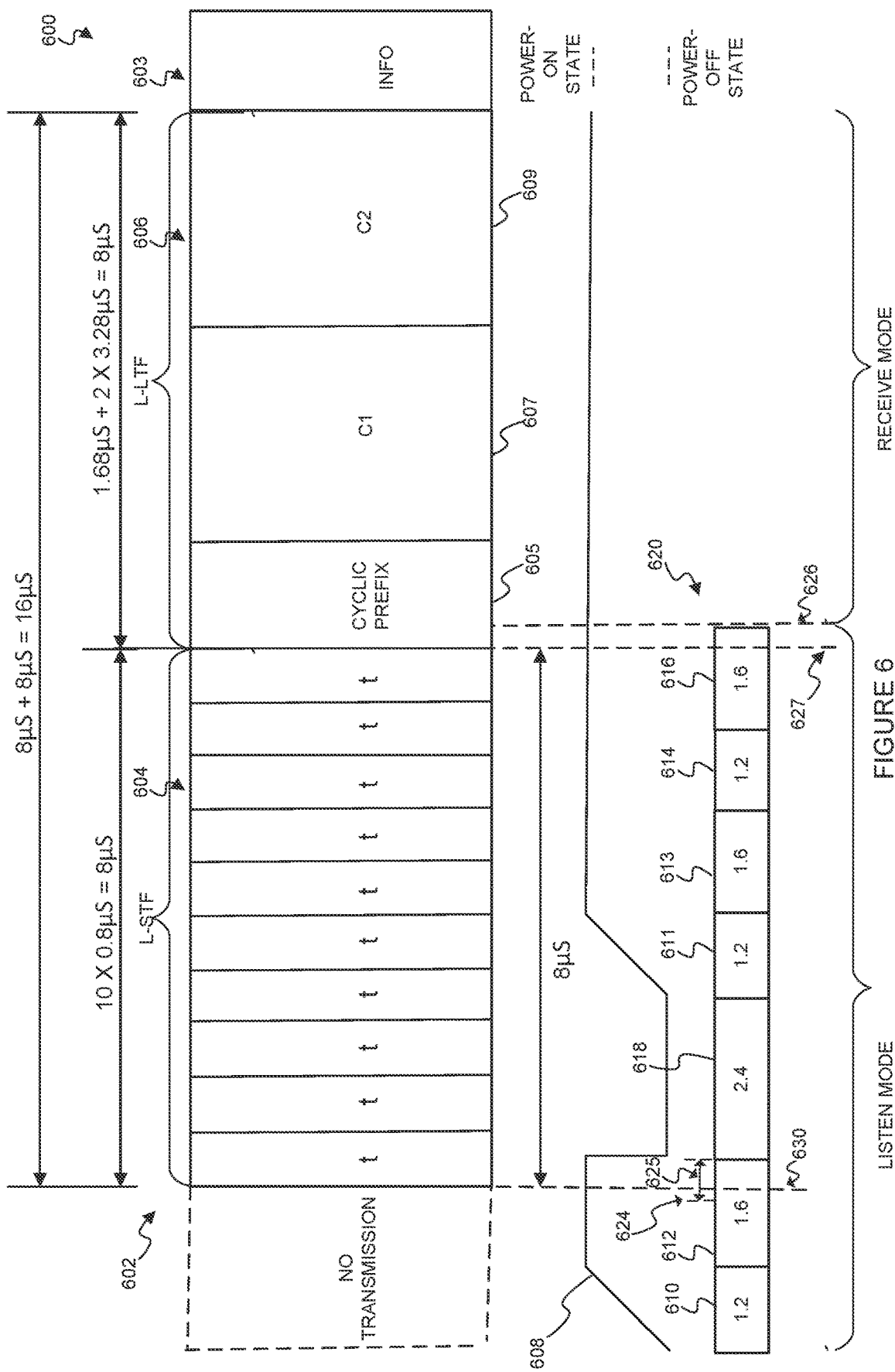
FIG. 6 shows example operations, timing, and power states for detecting a packet preamble of a PPDU in the listen mode.

FIG. 6 shows example operations, timing, and power states for detecting a packet preamble 602 of a PPDU 600 in the listen mode. The packet preamble 602 may include an L-STF 604, an L-LTF 606 and other information 603 (such as a packet payload). When a PPDU is transmitted over a wireless channel, the transmission of certain fields may have certain durations that are defined by a technical standard, such as the IEEE 802.11 standard. For example, the transmission of the L-STF 604 may have a duration of approximately 8 µs. In some implementations, the L-STF 604 may include STF information (such as an OFDM symbol) that is repeated ten times over the 8 µs, as shown in FIG. 6. In some implementations, the transmission of the L-LTF 606 may have a duration of approximately 8 µs. In some implementations, the L-LTF 606 may include LTF information including a cyclic prefix 605, an OFDM symbol C1 607 and an OFDM symbol C2 609. The LTF information may be transmitted over the 8 µs, as shown in FIG. 6.

In the listen mode, the STA 201 may switch between monitoring the wireless channel for the PPDU 600 and not monitoring the wireless channel. Operations for monitoring the wireless channel may include at least one radio and data path settling operation. The radio and data path settling operation may power-up the RF front end (such as RF front end 406) after a power-off state. The radio and data path settling operation also may allow radio and data paths in the RF front end to settle and be ready to perform additional operations for monitoring the wireless channel. The monitoring operations also may include at least one autocorrelation operation for detecting the L-STF 604 of the PPDU 600 (such as by detecting repetitions of the STF information included in the L-STF 604). Operations for not monitoring the wireless channel may include an operation for configuring packet detection components into the power-off state. In the listen mode, the STA 201 may switch between monitoring the wireless channel and not monitoring the wireless channel until a packet preamble is detected, such as the L-STF 604 of the packet preamble 602. If the STA 201 detects the L-STF 604, the STA 201 may perform operations to prepare for processing the L-LTF 606. In some implementations, these operations may include a gain change operation and a coarse timing operation. The gain change operation may change the gain of an amplifier in the RF front end (such as RFA 416) to improve the strength or amplitude of the received signal associated with the PPDU 600 for further processing. The coarse timing operation may follow the gain change operation. The coarse timing operation may adjust coarse timing of the RF front end 406 to align the frame to symbol boundary of the L-LTF 606.

As shown in FIG. 6, an example operation sequence 620 may include operations for the listen mode. The operation sequence 620 may begin with operations for monitoring a wireless channel for the PPDU 600. For example, the operation sequence 620 may begin with a first radio and data path settling operation 610 and a first autocorrelation operation 612. In some implementations, the STA 201 can detect the L-STF 604 if an autocorrelation operation (such as the first autocorrelation operation 612) commences after receiving the L-STF 604. In the example shown in FIG. 6, a timing line 630 indicates that the STA 201 commenced the first autocorrelation operation 612 before receiving the L-STF 604. Hence, in the example shown in FIG. 6, the STA 201 did not detect the L-STF 604. The operation sequence 620 may continue with an operation by which the STA 201 stops monitoring the wireless channel. For example, the operation sequence 620 may perform a power-off operation 618 to cease monitoring the wireless channel. After the power-off operation 618, the STA 201 may resume monitoring the wireless channel. For example, the STA 201 may perform a second radio and data path settling operation 611 and a second autocorrelation operation 613. In the operation sequence 620, the STA 201 may detect the L-STF 604 by performing the second autocorrelation operation 613 after receiving the L-STF 604. In some implementations, the second autocorrelation operation 613 may detect two repetitions of STF information in the L-STF 604. After detecting the L-STF 604, the STA 201 may perform operations to prepare for processing the L-LTF 606. In the operation sequence 620, the STA 201 may perform the gain change operation 614 and the coarse timing operation 616 to prepare for processing the L-LTF 606. After preparing for the L-LTF 606, the STA 201 may switch into the receive mode. In the receive mode, the STA 201 may perform operations for processing the L-LTF 606 and the remainder of the PPDU 600.

The operations of the listen and receive modes may have associated power states. When monitoring the wireless channel in listen mode, the power state controller 404 of the STA 201 may configure the packet detection components into the power-on state. When the STA 201 stops monitoring the wireless channel, the power state controller 404 may configure to the packet detection components into the power-off state. As shown in FIG. 6, an example power graph 608 shows power states associated with operations performed in the listen and receive modes. As shown in the operation sequence 620, the listen mode may include a first radio and data path settling operation 610. The power state controller 404 may provide power to the packet detection components in order to enter the power-on state for the first radio and data path settling operation 610, as shown in the power graph 608. The power state controller 404 may keep the packet detection components in the power-on state for the first autocorrelation operation 612, as shown in the power graph 608. After monitoring the wireless channel, the STA 201 may stop monitoring the wireless channel. To stop monitoring the wireless channel, the power state controller 404 may perform the power-off operation 618. For the power-off operation 618, the power state controller 404 may stop providing power to the packet detection components in order to enter the power-off state, as shown in the power graph 608. The STA 201 may resume monitoring the wireless channel by performing the second radio and data path settling operation 611. For the second radio and data path settling operation 611, the power state controller 404 may provide power to the packet detection components in order to enter the power-on state. The power state controller 404 may keep the packet detection components in the power-on state for the second autocorrelation operation 613, gain change operation 614 and coarse timing operation 616, as shown in the power graph 608. As show in the power graph 608, the packet detection components may remain in the power-on state throughout the receive mode.

Operations in the listen mode may involve timing aspects related to a PPDU. For example, a PPDU may have one or more transmission times defined in the IEEE 802.11 standard. As shown in FIG. 6, the L-STF 604 may be transmitted in 8 µs. In some implementations, the listen mode operations can detect the L-STF 604 within 8 µs. The listen mode operations may include operations for monitoring the wireless channel, not monitoring the wireless channel and preparing for an L-LTF. As shown in FIG. 6, the operations for monitoring the wireless channel may include the first radio and data path settling operation 610 and the first autocorrelation operation 612. In some implementations, the first radio and data path settling operation 610 may have a duration of 1.2 μs and the first autocorrelation operation 612 may have a duration of 1.6 μs. Hence, a duration for monitoring the wireless channel may be 2.8 μs (1.2 μs+1.6 μs). As shown in FIG. 6, the STA 201 may stop monitoring the wireless channel by performing the power-off operation 618. In some implementations, the STA 201 may stop monitoring the wireless channel for 2.4 μs, as shown in the operation sequence 620. Hence, the duration of operations for both monitoring and not monitoring the wireless channel may be 5.2 μs (2.4 μs+2.8 μs). In this example, the duty cycle for the listen mode may be 46% (2.4/5.2). In some implementations, after detecting the L-STF 604, the STA 201 may perform operations to prepare for processing the L-LTF 606. For example, the STA 201 may perform the gain change operation 614 and the coarse timing operation 616 to prepare for processing the L-LTF 606. In some implementations, the gain change operation 614 may have a duration of 1.2 μs and the coarse timing operation 616 may have a duration of 1.6 μs, as shown in the operation sequence 620. Hence, the operations for preparing for the L-LTF 606 may have a duration of 2.8 μs (1.2 μs+1.6 μs). A total duration for monitoring (2.8 μs), not monitoring (2.4 μs) and preparing for the L-LTF 606 (2.8 μs) may be 8 μs (2.8 μs+2.4 μs+2.8 μs=8 μs). Since the total duration of listen mode operations is 8 μs, the STA 201 may detect the L-STF 604 within its 8 μs transmission time.

Another timing aspect of the listen mode relates to detecting an L-STF when monitoring the wireless channel. In some implementations, the STA 201 may perform an autocorrelation operation to detect the L-STF, such as by detecting repetitions of STF information associated with the L-STF. There may be a detection duration for detecting a portion of the STF information via autocorrelation. The detection duration may indicate how late into the autocorrelation operation an L-STF may be received and still be detected. As shown in FIG. 6, the STA 201 may have a detection duration 625 for detecting a portion of the L-STF 604 (such as a portion of one repetition of the STF information). In some implementations, the detection duration 625 may be 0.4 μs. In FIG. 6, an arrival deadline 624 indicates a latest time the L-STF 604 may arrive and be detected by the first autocorrelation operation 612. In FIG. 6, the timing line 630 shows that the L-STF 604 arrives after the arrival deadline 624, so the L-STF 604 is not detected. If the L-STF 604 had arrived before the arrival deadline 624, the STA 201 may have detected the L-STF 604. In some implementations, the detection duration 625 may affect how long the STA 201 stops monitoring the wireless channel. For example, if the detection duration 625 were longer, the duration of the power-off operation 618 may be shortened to ensure that the STA 201 can detect the L-STF 604 within 8 μs.

Another timing aspect of the listen mode relates to coarse timing. In some implementations, the STA 201 may perform a coarse timing operation in preparation for processing an L-LTF. For example, as shown in FIG. 6, the STA 201 may perform the coarse timing operation 616 in preparation for processing the L-LTF 606. A coarse timing deadline may indicate a latest time the STA 201 may complete a coarse timing operation and still be ready to process an L-LTF. If a coarse timing operation is not complete by the coarse timing deadline, the STA 201 may not be able to process the L-LTF. As shown in FIG. 6, a timing line 627 indicates when the STA 201 receives the L-STF 606. A coarse timing deadline 626 indicates a latest time the STA 201 may complete the coarse timing operation 616 and still process the L-LTF 606. In some implementations, the coarse timing deadline may be 0.4 μs after the L-LTF is received. In some implementations, the coarse timing deadline may affect how long the STA 201 may stop monitoring the wireless channel. For example, if the coarse timing deadline 626 were shorter, the duration of the power-off operation 618 may be shortened to ensure that the STA 201 can detect the L-STF 604 within 8 μs.

In some implementations, the STA 201 may reduce time in the power-on state in the listen mode. For example, the STA 201 reduce time monitoring the wireless channel in the power-on state. Operations for monitoring the wireless channel may include a radio and data path settling operation (such as the radio and data path settling operation 610) and an autocorrelation operation (such as the first autocorrelation operation 612). In some implementations, the autocorrelation operation may be replaced with a match filtering operation. For example, instead of using autocorrelation to detect an L-STF, the STA 201 may use match filtering to detect the L-STF. A match filtering operation may use pattern matching to detect the L-STF. For example, the match filtering operation may detect the L-STF by detecting a single repetition of STF information using pattern matching. In some implementations, a match filtering operation may have a duration of 1 μs (compared to 1.6 μs for some implementations of the autocorrelation operation). In some implementations, the STA 201 may monitor the wireless channel by performing both the radio and data path settling operation and the match filtering operation. A combined duration for the match filtering operation (1 μs) and the radio and data path settling operation (1.2μ) may be 2.2 μs. Hence, a duration for monitoring the wireless channel may be 2.2 μs.

In some implementations, the STA 201 also may perform a coarse timing operation (such as the coarse timing operation 616) using the 1 μs match filtering operation. When the STA 201 uses the 1 μs match filtering operation for the course timing operation (such as for operation 616), the STA 201 may stop monitoring the wireless channel for 3.6 μs. Hence, the duration of operations for both monitoring and not monitoring the wireless channel may be 5.8 μs (3.6 μs+2.2 μs). In this example, the duty cycle for the listen mode may be 62% (3.6/5.8).

In some implementations, a packet may include an L-STF of any suitable duration. For example, a packet may include a greenfield preamble with an L-STF that is longer than 8 μs. A greenfield preamble may be defined in the IEEE 802.11be standard. In some implementations, the greenfield preamble may include an L-STF that has a duration of 10 μs or longer. In some implementations, the STA 201 may perform operations in the power-on state for 2.2 μs, as described in FIG. 6. Given the L-STF of 10 μs and the power-on state operations of 2.2 μs, the STA can remain in the power-off state for 3.6 μs and still detect the L-STF 604 within 10 μs. Given the 10 μs L-STF and the timing of the power-on state operations shown in FIG. 6, the STA 201 may achieve a duty cycle of 62%. In some implementations, the duty cycle may depend, at least in part, on the duration of the L-STF and the speed of operations for detecting the L-STF.

Figure 7:
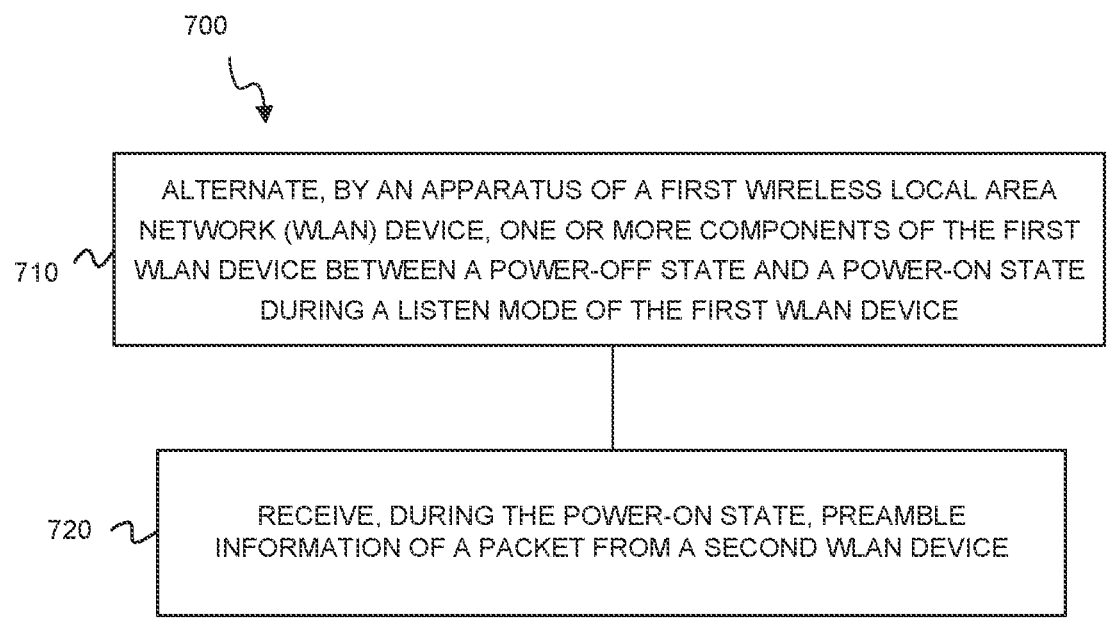
FIG. 7 depicts a process for wireless communication in a wireless local area network (WLAN) including example operations performed by an apparatus of STA.

FIG. 7 depicts a process 700 for wireless communication in a WLAN including example operations performed by an apparatus of STA. The process 700 may be performed by a wireless communication device such as the wireless communication device 800 or the electronic device 1000 described with reference to FIGS. 8 and 10, respectively. In some implementations, the process 700 may be performed by a wireless communication device operating as or within an STA, such as one of the STAs 104, 201 and 904 described with reference to FIGS. 1, 2, 3 and 9B.

At block 710, an apparatus of a first WLAN device may alternate one or more components of the first WLAN device between a power-off state and a power-on state during a listen mode of the first WLAN device.

At block 720, the apparatus may receive, during the power-on state, preamble information of a packet from a second WLAN device.

Figure 8:
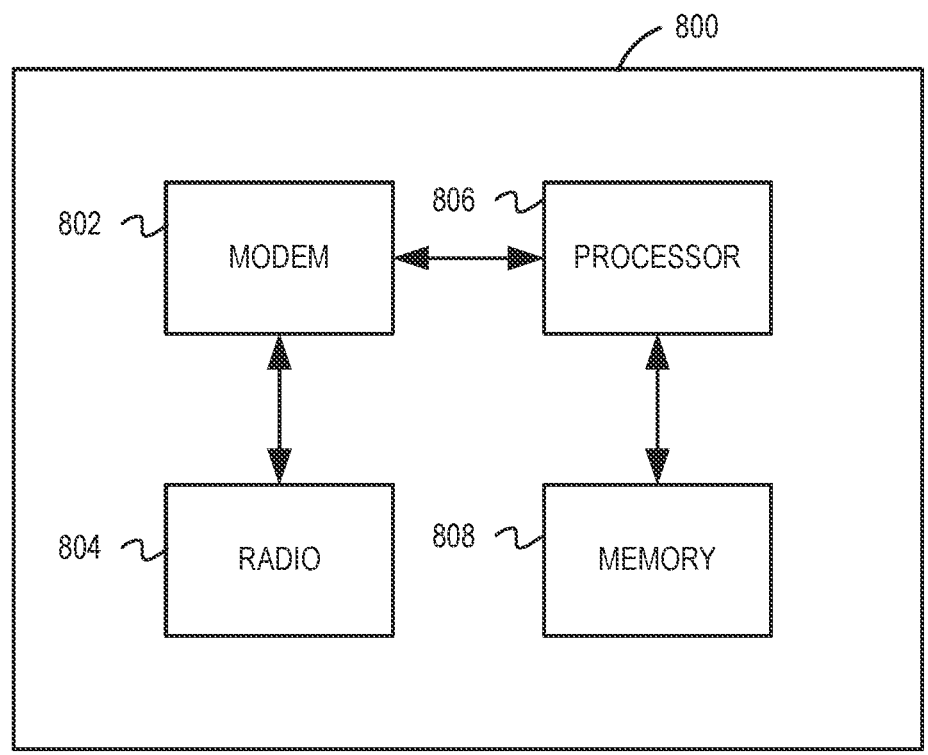
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 or the STA 201 described herein. In some implementations, the wireless communication device 800 can be an example of a device for use in an AP such as the AP 102 described herein. The wireless communication device 800 may be generally referred to as an apparatus or a wireless communication apparatus. The wireless communication device 800 is capable of transmitting (or outputting for transmission) and receiving wireless communications (for example, in the form of wireless packets). For example, the wireless communication device 800 can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be, in addition to future 802.11 standards.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements (collectively "the processor 806") and one or more memory blocks or elements (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which transmits the symbols via the coupled antennas. Similarly, symbols received via the antennas are obtained by the radio 804, which provides the symbols to the modem 802. In some implementations, the radio 804 and the one or more antennas may form one or more network interfaces (which also may be referred to as "interfaces").

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets.

The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the wireless communication device 800 may include a power state controller (not shown). The power state controller may be similar to the power state controller 404 described with reference to FIG. 4 and may implement any of the operations for controlling power described herein. In some implementations, the power state controller may be implemented by the processor 806 and the memory 808. The memory 808 may include computer instructions executable by the processor 806 to implement the functionality of the power state controller. Any of these functionalities may be partially (or entirely) implemented in hardware or on the processor 806.

In some implementations, the processor 806 and the memory 808 of the wireless communication device 800 may be referred to as a processing system. A processing system may generally refer to a system or series of machines or components that receives inputs and processes the inputs to produce a set of outputs (which may be passed to other systems or components of, for example, one of the STAs 104 or one of the APs 102). In some implementations, the processing system may include the processor 806, the memory 808, and one or more other components of the wireless communication device 800, such as the modem 802.

In some implementations, the processing system of a STA 104 may interface with other components of the STA 104, and may process information received from other components (such as inputs or signals), output information to other components, etc. For example, a chip or modem of the STA 104 (such as the wireless communication device 800) may include a processing system and one or more interfaces. The one or more interfaces may include a first interface to receive or obtain information, and a second interface to output, transmit or provide information. In some cases, the first interface may refer to an interface between the processing system of the chip or modem and a receiver, such that the STA 104 may receive information or signal inputs, and the information may be passed to the processing system. In some cases, the second interface may refer to an interface between the processing system of the chip or modem and a transmitter, such that the STA 104 may transmit information output from the chip or modem. A person having ordinary skill in the art will readily recognize that the second interface also may obtain or receive information or signal inputs, and the first interface also may output, transmit or provide information.

In some implementations, the processing system of an AP 102 may interface with other components of the AP 102, and may process information received from other components (such as inputs or signals), output information to other components, etc. For example, a chip or modem of the AP 102 (such as the wireless communication device 800) may include a processing system, a first interface to receive or obtain information, and a second interface to output, transmit or provide information. In some cases, the first interface may refer to an interface between the processing system of the chip or modem and a receiver, such that the AP 102 may receive information or signal inputs, and the information may be passed to the processing system. In some cases, the second interface may refer to an interface between the processing system of the chip or modem and a transmitter, such that the AP 102 may transmit information output from the chip or modem. A person having ordinary skill in the art will readily recognize that the second interface also may obtain or receive information or signal inputs, and the first interface also may output, transmit or provide information.

Figure 9B:
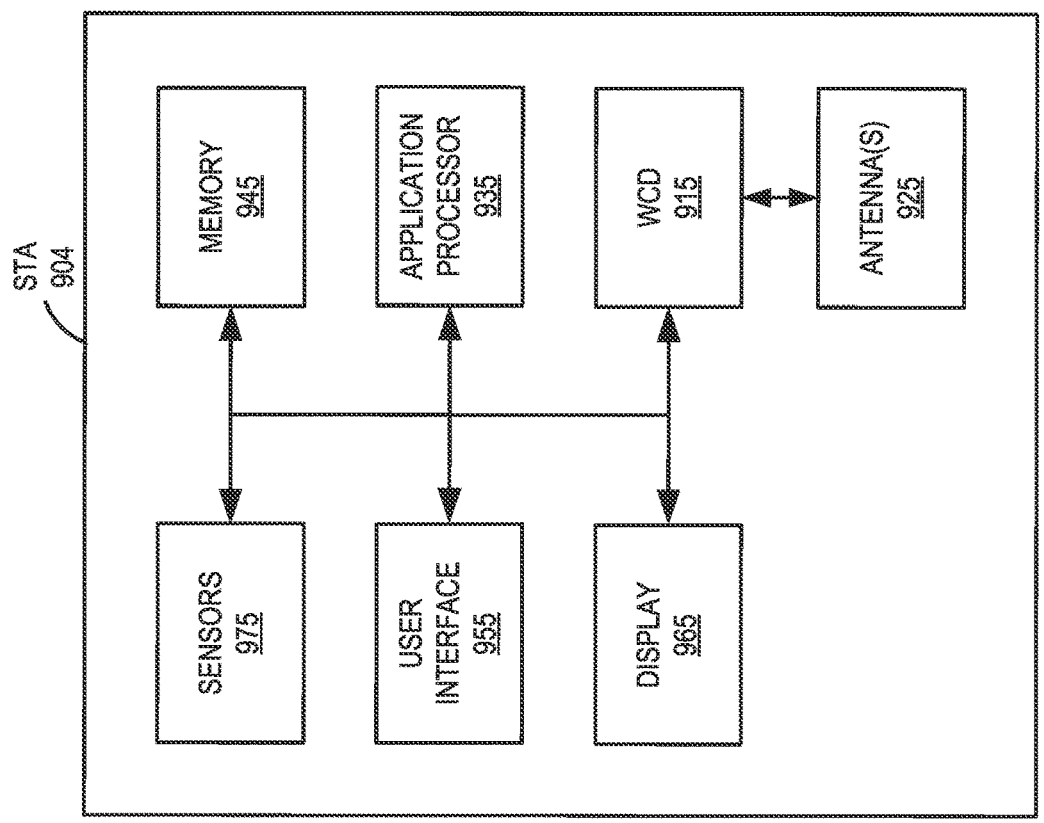
FIG. 9B shows a block diagram of an example STA.
Figure 9A:
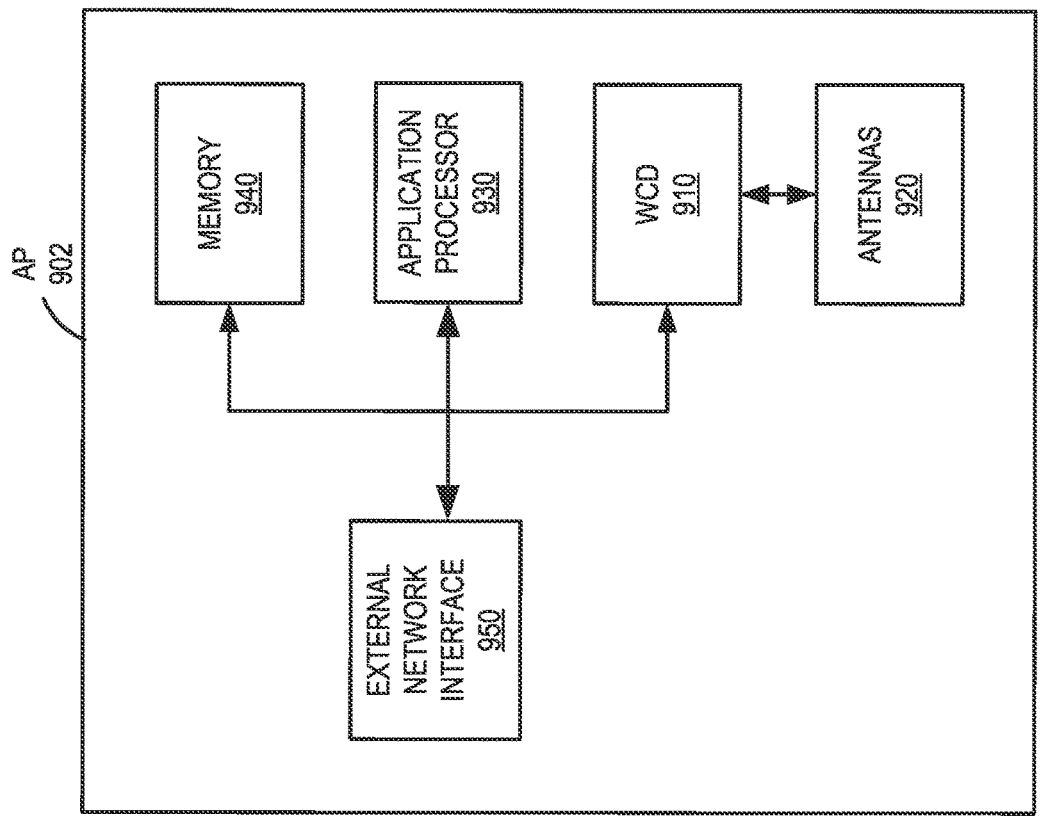
FIG. 9A shows a block diagram of an example access point (AP).

FIG. 9A shows a block diagram of an example AP 902. For example, the AP 902 can be an example implementation of the AP 102 described herein. The AP 902 includes a wireless communication device 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 or the STA 201 described herein. The STA 904 includes a wireless communication device 915. For example, the wireless communication device 915 may be an example implementation of the wireless communication device 800 described with reference to FIG. 8. The STA 904 also may include one or more antennas 925 coupled with the wireless communication device 915 to transmit and receive wireless communications. The STA 904 additionally may include an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

Figure 10:
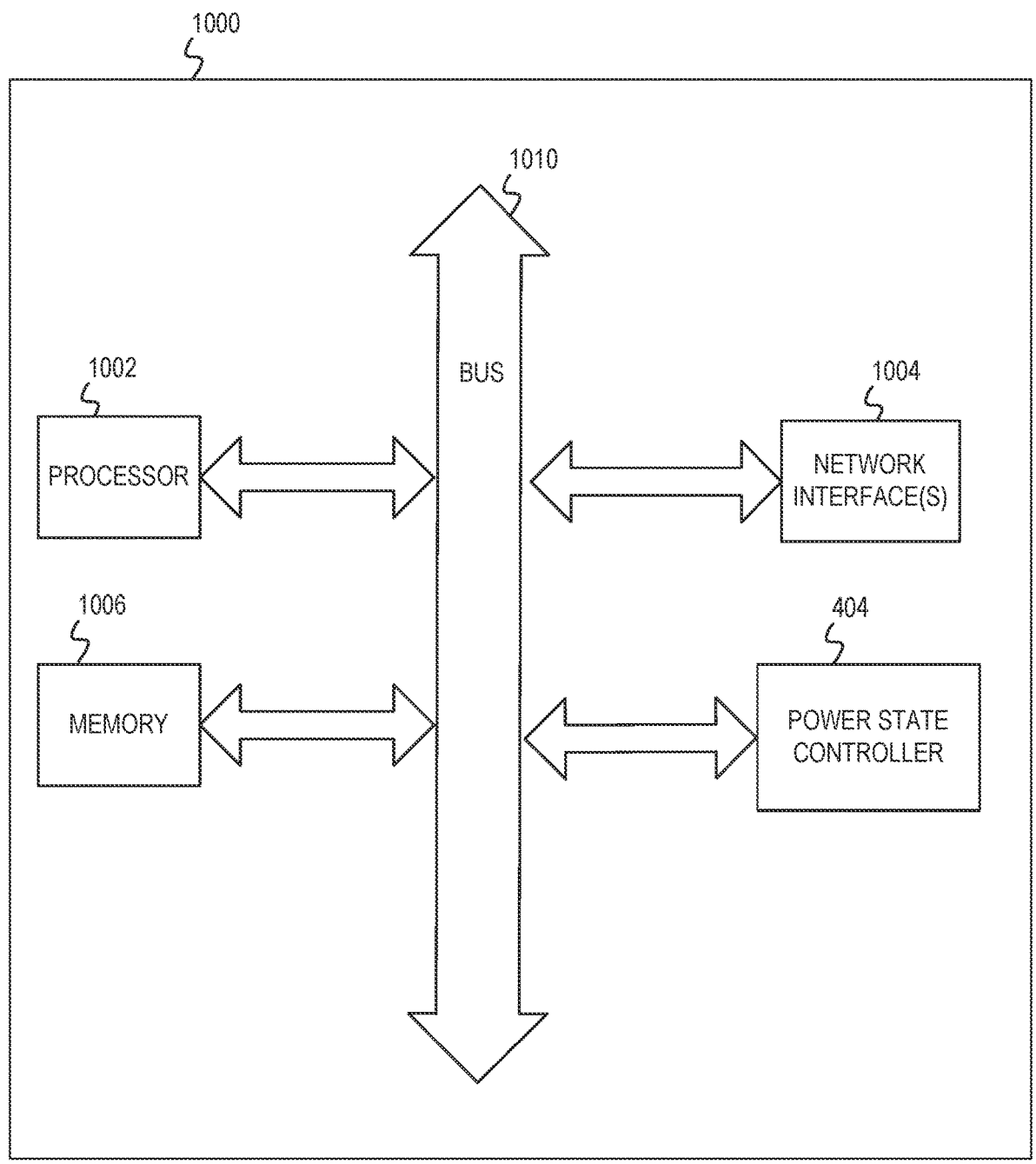
FIG. 10 shows a block diagram of an example electronic device for implementing aspects of this disclosure.

FIG. 10 shows a block diagram of an example electronic device for implementing aspects of this disclosure. In some implementations, the electronic device 1000 may be one of an AP (including any of the APs described herein), a range extender, a station (including any of the STAs described herein) or other electronic systems. The electronic device 1000 can include a processor 1002 (possibly including multiple processors, multiple cores, multiple nodes, or implementing multi-threading, etc.). The electronic device 1000 also can include a memory 1006. The memory 1006 may be system memory or any one or more of the possible realizations of computer-readable media described herein. In some implementations, the processor 1002 and the memory 1006 may be referred to as the processing system. The electronic device 1000 also can include a bus 1010 (such as PCI, ISA, PCI-Express, HyperTransport®, InfiniBand®, NuBus®, AHB, AXI, etc.), and one or more network interfaces 1004 (which also may be referred to as "interfaces") that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1000 may support multiple network interfaces—each of which is configured to couple the electronic device 1000 to a different communication network.

The electronic device 1000 may include a power state controller 404, which may implement operations for controlling power, as described herein. In some implementations, the power state controller 404 may be distributed within the processor 1002 and the memory 1006. The power state controller 404 may perform some or all the location aware steering operations described herein in this disclosure. In some implementations, the network interfaces 1004 may include the RF front end 406, the ADC 408, and the baseband processing unit 410. In some implementations, the network interfaces also may include the power state controller 404.

The memory 1006 can include computer instructions executable by the processor 1002 to implement the functionality of the implementations described in FIGS. 1-10. Any of these functionalities may be partially (or entirely) implemented in hardware or on the processor 1002. For example, the functionality may be implemented with an application specific integrated circuit, in logic implemented in the processor 1002, in a co-processor on a peripheral device or card, etc. Further, realizations may include fewer or additional components not illustrated in FIG. 10 (such as video cards, audio cards, additional network interfaces, peripheral devices, etc.). The processor 1002, the memory 1006, and the network interface 1004 are coupled to the bus 1010. Although illustrated as being coupled to the bus 1010, the memory 1006 may be coupled to the processor 1002.

FIGS. 1-10 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One innovative aspect of the subject matter described in this disclosure can be implemented in a method for wireless communication performed by an apparatus of a first AP in a WLAN. The method may include alternating one or more components of the first WLAN device between a power-off state and a power-on state during a listen mode of the first WLAN device. The method may include receiving, during the power-on state, preamble information of a packet from a second WLAN device.

Clause 2. The method of clause 1 further including performing autocorrelation on the preamble information to detect a preamble of the packet.

Clause 3. The method of any one or more of clauses 1-2, where the first WLAN device remains in the power-on state to perform the autocorrelation on the preamble information. The method further including, in response to detecting the preamble of the packet based on the autocorrelation, ceasing alternating the one or more components of the WLAN device between the power-off state and the power-on state during the listen mode. The method further including commencing a receive mode for processing the packet.

Clause 4. The method of any one or more of clauses 1-3, where a preamble of the packet includes a number of repetitions of the preamble information. The method further including detecting the preamble information by detecting one or more of the repetitions of the preamble information.

Clause 5. The method of any one or more of clauses 1-4, where the number of repetitions of the preamble information includes a number of repetitions of STF information.

Clause 6. The method of any one or more of clauses 1-5, where a duration of the power-off state and a duration of the power-on state are based, at least in part, on the number of repetitions of preamble information and a duration of time for detection of the preamble of the packet.

Clause 7. The method of any one or more of clauses 1-6, where alternating the one or more components between the power-off state and the power-on state includes alternating the one or more components between the power-off state and the power-on state according to a duty cycle.

Clause 8. The method of any one or more of clauses 1-7, where alternating the one or more components of the first WLAN device between the power-off state and the power-on state is performed when an RSSI is greater than an RSSI threshold.

Clause 9. The method of any one or more of clauses 1-8, where alternating the one or more components of the first WLAN device between the power-off state and the power-on state is performed when an RSSI is greater than a first RSSI threshold and less than a second RSSI threshold.

Clause 10. The method of any one or more of clauses 1-9, where the one or more components of the first WLAN device include at least one of a one or more components of an RF front end, an ADC, and one or more components of a baseband processing unit.

Clause 11. The method of any one or more of clauses 1-10, further including performing match filtering on the preamble information to detect a preamble of the packet.

Clause 12. The method of any one or more of clauses 1-11, where the first WLAN device remains in the power-on state to perform the match filtering on the preamble of the packet.

Clause 13. Another innovative aspect of the subject matter described in this disclosure can be implemented in an apparatus of a first WLAN device for wireless communication. The apparatus of the first WLAN device may include a processor configured to alternate one or more components of the first WLAN device between a power-off state and a power-on state during a listen mode of the first WLAN device. The apparatus of the first WLAN device may include an interface configured to obtain, during the power-on state, preamble information of a packet from a second WLAN device.

Clause 14. The apparatus of clause 13, where the processor is further configured to perform autocorrelation on the preamble information to detect a preamble of the packet.

Clause 15. The apparatus of any one or more of clauses 13-14, where the processor is further configured to, in response to detection of the preamble of the packet based on the autocorrelation, cease alternation of the one or more components of the first WLAN device between the power-off state and the power-on state during the listen mode. The processor may be further configured to commence a receive mode to process the packet.

Clause 16. The apparatus of any one or more of clauses 13-15, where a preamble of the packet includes a number of repetitions of the preamble information, and where detection of the preamble includes detection of one or more of the repetitions of the preamble information.

Clause 17. The apparatus of any one or more of clauses 13-16, where the number of repetitions of the preamble information includes a number of repetitions of STF information.

Clause 18. The apparatus of any one or more of clauses 13-17, where a duration of the power-off state and a duration of the power-on state are based, at least in part, on the number of repetitions of preamble information and a duration of time for detection of the preamble of the packet.

Clause 19. The apparatus of any one or more of clauses 13-18, where alternation of the one or more components between the power-off state and the power-on state includes alternation of the one or more components between the power-off state and the power-on state according to a duty cycle.

Clause 20. The apparatus of any one or more of clauses 13-19, where the interface is further configured to obtain an RSSI associated with the packet, wherein alternation of the one or more components of the first WLAN device between the power-off state and the power-on state to occur in response to the RSSI being greater than an RSSI threshold.

Clause 21. The apparatus of any one or more of clauses 13-20, where the interface is further configured to obtain an RSSI associated with the packet, where alternation of the one or more components of the first WLAN device between the power-off state and the power-on state to occur in response to the RSSI being greater than a first RSSI threshold and less than a second RSSI threshold.

Clause 22. The apparatus of any one or more of clauses 13-21, where the one or more components of the first WLAN device include at least one of one or more components of an RF front end, an ADC, and one or more components of a baseband processing unit.

Clause 23. The apparatus of any one or more of clauses 13-22, where the processor is further configured to perform match filtering on one or more fields of the preamble information to detect a preamble of the packet.

Clause 24. Another innovative aspect of the subject matter described in this disclosure can be implemented in a non-transitory computer-readable medium that stores instructions which, when executed by a processor of a first WLAN device, cause the first WLAN device to perform operations for communication in a WLAN. The operations may cause the first WLAN device to alternate one or more components of the first WLAN device between a power-off state and a power-on state during a listen mode of the first WLAN device. The operations may cause the first WLAN device to obtain, during the power-on state, preamble information of a packet from a second WLAN device.

Clause 25. The non-transitory computer-readable medium of any one or more of clauses 1-12 and 24, where the instructions further cause the first WLAN device to perform autocorrelation on the preamble information to detect a preamble of the packet.

Clause 26. The non-transitory computer-readable medium of any one or more of clauses 1-12 and 24-25, where the first WLAN device remains in the power-on state to perform the autocorrelation on the preamble information. The instructions further cause the first WLAN device to, in response to detect the preamble of the packet based on the autocorrelation, cease alternating the one or more components of the WLAN device between the power-off state and the power-on state during the listen mode, and commence a receive mode to process the packet.

Clause 27. The non-transitory computer-readable medium of any one or more of clauses 1-12 and 24-26, where the preamble information includes a number of repetitions of a symbol. The instructions to further cause the first WLAN device to detect the preamble information by detecting one or more of the repetitions of the symbol.

Clause 28. Another innovative aspect of the subject matter described in this disclosure can be implemented in an apparatus of a first WLAN device for wireless communication. The apparatus of the first WLAN device may include a means for alternating one or more components of the first WLAN device between a power-off state and a power-on state during a listen mode of the first WLAN device. The apparatus of the first WLAN device may include a means for obtaining, during the power-on state, preamble information of a packet from a second WLAN device.

Clause 29. The apparatus of any one or more of clauses 1-12 and 28, further including a means for performing autocorrelation on the preamble information to detect a preamble of the packet.

Clause 30. The apparatus of any one or more of clauses 1-12 and 28-29, where the first WLAN device remains in the power-on state to perform the autocorrelation on the preamble information. The apparatus further including a means for, in response to detecting the preamble of the packet based on the autocorrelation, ceasing alternating the one or more components of the WLAN device between the power-off state and the power-on state during the listen mode, and commencing a receive mode for processing the packet.

Another innovative aspect of the subject matter described in this disclosure can be implemented as an apparatus of a station or an apparatus of an AP for wireless communications. The apparatus may include one or more interfaces and one or more processors configured to perform any one of the above-mentioned methods or features described herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray' disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communications in a wireless local area network (WLAN) performed by a first WLAN device, comprising:
    alternating, during a listen mode, one or more components of the first WLAN device between a power-off state of the listen mode and a power-on state of the listen mode of the first WLAN device in accordance with a duty cycle;
    cycling, by the first WLAN device, between the listen mode, a receive mode, and a sleep mode; and receiving, during the power-on state of the listen mode, preamble information of a packet from a second WLAN device.

2. The method of claim 1 further comprising:
performing autocorrelation on the preamble information to detect a preamble of the packet.

3. The method of claim 2, wherein the first WLAN device remains in the power-on state of the listen mode to perform the autocorrelation on the preamble information, further comprising:
in response to detecting the preamble of the packet based on the autocorrelation, ceasing alternating the one or more components of the first WLAN device between the power-off state of the listen mode and the power-on state of the listen mode, and commencing the receive mode for processing the packet.

4. The method of claim 1, wherein a preamble of the packet includes a number of repetitions of the preamble information, further comprising:
detecting the preamble information by detecting one or more of the repetitions of the preamble information.

5. The method of claim 4, wherein the number of repetitions of the preamble information includes a number of repetitions of short training field (STF) information.

6. The method of claim 4, wherein a duration of the power-off state of the listen mode and a duration of the power-on state of the listen mode are based, at least in part, on the number of repetitions of preamble information and a duration of time for detection of the preamble of the packet.

7. The method of claim 1, wherein alternating the one or more components between the power-off state of the listen mode and the power-on state of the listen mode includes alternating the one or more components between the power-off state of the listen mode and the power-on state of the listen mode according to the duty cycle.

8. The method of claim 1, wherein alternating the one or more components of the first WLAN device between the power-off state of the listen mode and the power-on state of the listen mode is performed when a received signal strength indicator (RSSI) is greater than an RSSI threshold.

9. The method of claim 1, wherein alternating the one or more components of the first WLAN device between the power-off state of the listen mode and the power-on state of the listen mode is performed when an RSSI is greater than a first RSSI threshold and less than a second RSSI threshold.

10. The method of claim 1, wherein the one or more components of the first WLAN device include at least one of:
one or more components of a radio frequency (RF) front end;
an analog-to-digital converter (ADC); and
one or more components of a baseband processing unit.

11. The method of claim 1, further comprising:
performing match filtering on the preamble information to detect a preamble of the packet.

12. The method of claim 11, wherein the first WLAN device remains in the power-on state of the listen mode to perform the match filtering on the preamble of the packet.

13. An apparatus of a first WLAN device for wireless communication, comprising:
a processor configured to:
alternate, during a listen mode, one or more components of the first WLAN device between a power-off state of the listen mode and a power-on state of the listen mode of the first WLAN device in accordance with a duty cycle;
cycle, by the first WLAN device, between the listen mode, a receive mode, and a sleep mode; and
an interface configured to obtain, during the power-on state of the listen mode, preamble information of a packet from a second WLAN device.

14. The apparatus of claim 13, wherein the processor is further configured to:
perform autocorrelation on the preamble information to detect a preamble of the packet.

15. The apparatus of claim 14, wherein the processor is further configured to:
in response to detection of the preamble of the packet based on the autocorrelation, cease alternation of the one or more components of the first WLAN device between the power-off state of the listen mode and the power-on state of the listen mode, and
commence the receive mode to process the packet.

16. The apparatus of claim 13, wherein a preamble of the packet includes a number of repetitions of the preamble information, and wherein detection of the preamble includes detection of one or more of the repetitions of the preamble information.

17. The apparatus of claim 16, wherein the number of repetitions of the preamble information includes a number of repetitions of short training field (STF) information.

18. The apparatus of claim 16, wherein a duration of the power-off state of the listen mode and a duration of the power-on state of the listen mode are based, at least in part, on the number of repetitions of preamble information and a duration of time for detection of the preamble of the packet.

19. The apparatus of claim 13, wherein alternation of the one or more components between the power-off state of the listen mode and the power-on state of the listen mode includes alternation of the one or more components between the power-off state of the listen mode and the power-on state of the listen mode according to the duty cycle.

20. The apparatus of claim 13, wherein the interface is further configured to:
obtain a received signal strength indicator (RSSI) associated with the packet, wherein alternation of the one or more components of the first WLAN device between the power-off state of the listen mode and the power-on state of the listen mode to occur in response to the RSSI being greater than an RSSI threshold.

21. The apparatus of claim 13, wherein the interface is further configured to:
obtain a received signal strength indicator (RSSI) associated with the packet, wherein alternation of the one or more components of the first WLAN device between the power-off state of the listen mode and the power-on state of the listen mode to occur in response to the RSSI being greater than a first RSSI threshold and less than a second RSSI threshold.

22. The apparatus of claim 13, wherein the one or more components of the first WLAN device include at least one of:
one or more components of a radio frequency (RF) front end;
an analog-to-digital converter (ADC); and
one or more components of a baseband processing unit.

23. The apparatus of claim 13, wherein the processor is further configured to:
perform match filtering on one or more fields of the preamble information to detect a preamble of the packet.

24. A non-transitory computer-readable medium having stored therein instructions which, when executed by a processor of a first wireless local area network (WLAN) device, cause the first WLAN device to:

alternate, during a listen mode, one or more components of the first WLAN device between a power-off state of the listen mode and a power-on state of the listen mode of the first WLAN device in accordance with a duty cycle;

cycle, by the first WLAN device, between the listen mode, a receive mode, and a sleep mode; and obtain, during the power-on state of the listen mode, preamble information of a packet from a second WLAN device.

25. The non-transitory computer-readable medium of claim 24, wherein the instructions further cause the first WLAN device to:

perform autocorrelation on the preamble information to detect a preamble of the packet.

26. The non-transitory computer-readable medium of claim 25, wherein the first WLAN device remains in the power-on state of the listen mode to perform the autocorrelation on the preamble information, and wherein the instructions further cause the first WLAN device to:

in response to detect the preamble of the packet based on the autocorrelation, cease alternating the one or more components of the first WLAN device between the power-off state of the listen mode and the power-on state of the listen mode, and commence the receive mode to process the packet.

27. The non-transitory computer-readable medium of claim 24, wherein the preamble information includes a number of repetitions of a symbol, and wherein the instructions further cause the first WLAN device to:

detect the preamble information by detecting one or more of the repetitions of the symbol.

28. An apparatus of a first WLAN device for wireless communication, comprising:

means for alternating, during a listen mode, one or more components of the first WLAN device between a power-off state of the listen mode and a power-on state of the listen mode of the first WLAN device in accordance with a duty cycle;

means for cycling, by the first WLAN device between the listen mode, a receive mode, and a sleep mode; and means for obtaining, during the power-on state of the listen mode, preamble information of a packet from a second WLAN device.

29. The apparatus of claim 28 further comprising:

means for performing autocorrelation on the preamble information to detect a preamble of the packet.

30. The apparatus of claim 29, wherein the first WLAN device remains in the power-on state of the listen mode to perform the autocorrelation on the preamble information, further comprising:

means for, in response to detecting the preamble of the packet based on the autocorrelation, ceasing alternating the one or more components of the first WLAN device between the power-off state of the listen mode and the power-on state of the listen mode during the listen mode, and means for commencing the receive mode for processing the packet.

\* \* \* \* \*